(12) United States Patent
Ailas (10) Patent No.: US 8,953,504 B2
(45) Date of Patent: Feb. 10, 2015

(54) REPEATER FOR TIME DIVISION DUPLEXED SIGNAL, AND CORRESPONDING MULTI-BAND REGENERATION AND NETWORK

(75) Inventor: Mohamed Ailas, Quebec (CA)

(73) Assignee: Universite de Quebec en Abitibi Temiscamingue, Quebec (CA)

( * ) Notice: Subject to any disclaimer, the term of this patent is extended or adjusted under 35 U.S.C. 154(b) by 96 days.

(21) Appl. No.: 13/497,401

(22) PCT Filed: Sep. 22, 2010

(86) PCT No.: PCT/CA2010/001524
§ 371 (c)(1),
(2), (4) Date: May 23, 2012

(87) PCT Pub. No.: WO2011/035435
PCT Pub. Date: Mar. 31, 2011

(65) Prior Publication Data
US 2012/0275351 A1   Nov. 1, 2012

Related U.S. Application Data (60) Provisional application No. 61/244,585, filed on Sep. 22, 2009.

(51) Int. Cl.
*H04B 7/14* (2006.01)
*H04W 88/08* (2009.01)
*H04B 3/36* (2006.01)

(52) U.S. Cl.
CPC .............. *H04W 88/085* (2013.01); *H04B 3/36* (2013.01)
USPC ........... 370/279; 370/278; 370/280; 370/310; 370/359

(58) Field of Classification Search
CPC ................................ H04L 5/14; H04W 88/085
USPC .................. 370/279, 280, 226, 278, 310, 359; 455/103

See application file for complete search history.

(56) References Cited

U.S. PATENT DOCUMENTS

| | | | |
|---|---|---|---|
| 5,187,803 A | 2/1993 | Sohner et al. | |
| 5,432,838 A | 7/1995 | Purchase et al. | |
| 5,697,067 A | 12/1997 | Graham et al. | |
| 6,032,020 A | 2/2000 | Cook et al. | |
| 7,024,157 B2 | 4/2006 | Waye et al. | |
| 7,362,171 B2 | 4/2008 | Kunihiro | |
| 8,570,913 B2 * | 10/2013 | Khlat et al. | 370/278 |
| 2004/0102219 A1 * | 5/2004 | Bunton et al. | 455/560 |
| 2004/0109440 A1 | 6/2004 | Mattathil | |
| 2010/0061334 A1 * | 3/2010 | Gault et al. | 370/330 |
| 2011/0310775 A1 * | 12/2011 | Khlat et al. | 370/278 |

OTHER PUBLICATIONS

Canadian Intellectual Property Office, International Search Report and Written Opinion of the International Searching Authority for PCT/CA2010/001524, dated Jan. 13, 2011.

Toshio Suzuki et al., Design of a Tunnel Relay System with a Leaky Coaxial Cable in an 800-MHz Band Land Mobile Telephone System, IEEE Transactions on Vehicular Technology, vol. VT-29, No. 3, Aug. 1980.

* cited by examiner

*Primary Examiner* — Chuong T Ho
(74) *Attorney, Agent, or Firm* — Bereskin & Parr LLP (57) ABSTRACT

Embodiments herein relate to a repeater for time division duplexed signals. The repeater comprises, for each channel of the time division duplexed signal, a pair of access points. The first access point of the pair being configured in a first mode, and the second access point of the pair being configured in a second mode. The pair of access points being linked by a broadband serial wired data connection. The invention further relates to a multi-band regenerator and a network comprising such a repeater.

12 Claims, 9 Drawing Sheets

REPEATER FOR TIME DIVISION DUPLEXED SIGNAL, AND CORRESPONDING MULTI-BAND REGENERATION AND NETWORK

RELATED APPLICATIONS

This application claims the benefit of U.S. Provisional Patent Application Ser. No. 61/244,585 filed Sep. 22, 2009, the entire contents of which are hereby incorporated by reference herein for all purposes.

FIELD

The embodiments herein relate to a repeater for time division duplexed signals, and a corresponding multi-band regenerator and network.

INTRODUCTION

Communications in underground environments and tunnels represent particular challenges. The most common communications systems rely on leaky feeders. A leaky feeder is often a coaxial cable that leaks signal by means of gaps along its length. The leakage of signal requires amplifying of the signal at certain intervals.

Directional and bi-directional amplifiers are common components used for amplifying a signal. However, directional and bi-directional amplifiers are generally not suitable for technologies relying on time division duplexing, as they introduce significant delays into the signal and thus limit data bandwidth.

The inventor has identified a need for a signal regenerator for transmitted signals relying on time division duplexing, and for a signal regenerator for a multi-band network transmitting multiple technologies including a time division duplexed signal. The inventor has also identified a need for providing a combined repeater and an access point to a multi-band network using a leaky feeder.

SUMMARY OF SOME EMBODIMENTS

Some embodiments as described herein provide a repeater for a time division duplexed signal. The repeater comprises, for each channel of the time division duplexed signal, a pair of access points. The first access point of the pair is configured in a first mode and the second access point of the pair is configured in a second mode. The pair of access points may be linked by a broadband serial wired data connection.

In another aspect, some embodiments as described herein relate to a network comprising a time division duplexed signal. The network comprises a leaky feeder and at least one repeater along the leaky feeder. The repeater comprises, for each channel of the time division duplexed signal, a pair of access points. The first access point of the pair is configured in a first mode and the second access point of the pair is configured in a second mode. The pair of access points may be linked by a broadband serial wired data connection.

In another aspect, some embodiments as described herein relate to a regenerator for a multi-band network. The regenerator comprises an input, a plurality of filters, amplifiers, and pairs of access points. The input is adapted for receiving and demultiplexing a signal transmitted on the leaky feeder, the signal comprising a plurality of multiplexed signals of different technologies, where each technology is carried on a predetermined frequency band. Each filter corresponds to one of the predetermined frequency bands. Each amplifier is associated to one of the filters and one of the technologies, and amplifies the corresponding filtered signal.

For each time division duplexed channel, a pair of wireless access points is assigned. The first access point of the pair is configured in a first mode and the second access point of the pair is configured in a second mode. The pairs of access points may be linked by a broadband serial wired data connection.

BRIEF DESCRIPTION OF THE DRAWINGS

In the following description, the following drawings are used to describe and exemplify various embodiments as generally described herein.

DESCRIPTION OF VARIOUS EMBODIMENTS

Embodiments herein relate to regeneration of signals transmitted over one or more leaky feeders. More particularly, some embodiments as described herein relate to the regeneration of multiple technologies concurrently transmitted over a leaky feeder network, and to a repeater for a time division multiplexed signal.

As used herein, the expressions "technology" and "technologies" are used to refer to the various types of signals transmitted over the leaky feeder, such as for example: radio signals (e.g., voice, video, telemetry), cellular signals (e.g. CDMA, GSM, etc), wireless data signals (WiFi, WiMax, Xbee, etc.), various IP applications, etc.

Reference is now made to FIGS. 1A to 1D, which schematically depict a network 100 transmitting multiple technologies over a leaky feeder 102. The network includes a series of leaky feeders 102a and 102b. The leaky feeders 102a and 102b act as the backbone of the network 100, by transmitting the signals of multiple technologies. As the signal leaks along the leaky feeder, transmitted signals must be regenerated at certain intervals. As will be described herein, one or more multi-band regenerators 104 are used to regenerate the multiple technologies.

FIG. 1 only depicts two serial leaky feeders 102a and 102b and one multi-band regenerator 104 for simplicity, however the network 100 could include multiple serial leaky feeders and several multi-band regenerators 104.

The multi-band regenerators 104 could be equally distant, or distributed at other intervals, such as based on the required power. In some embodiments, the multi-band regenerators 104 could be identical or complimentary, i.e. one multi-band regenerator 104 could regenerate a subset of the signals while another multi-band regenerator 104 regenerates another subset of the signals.

Figure 1A:
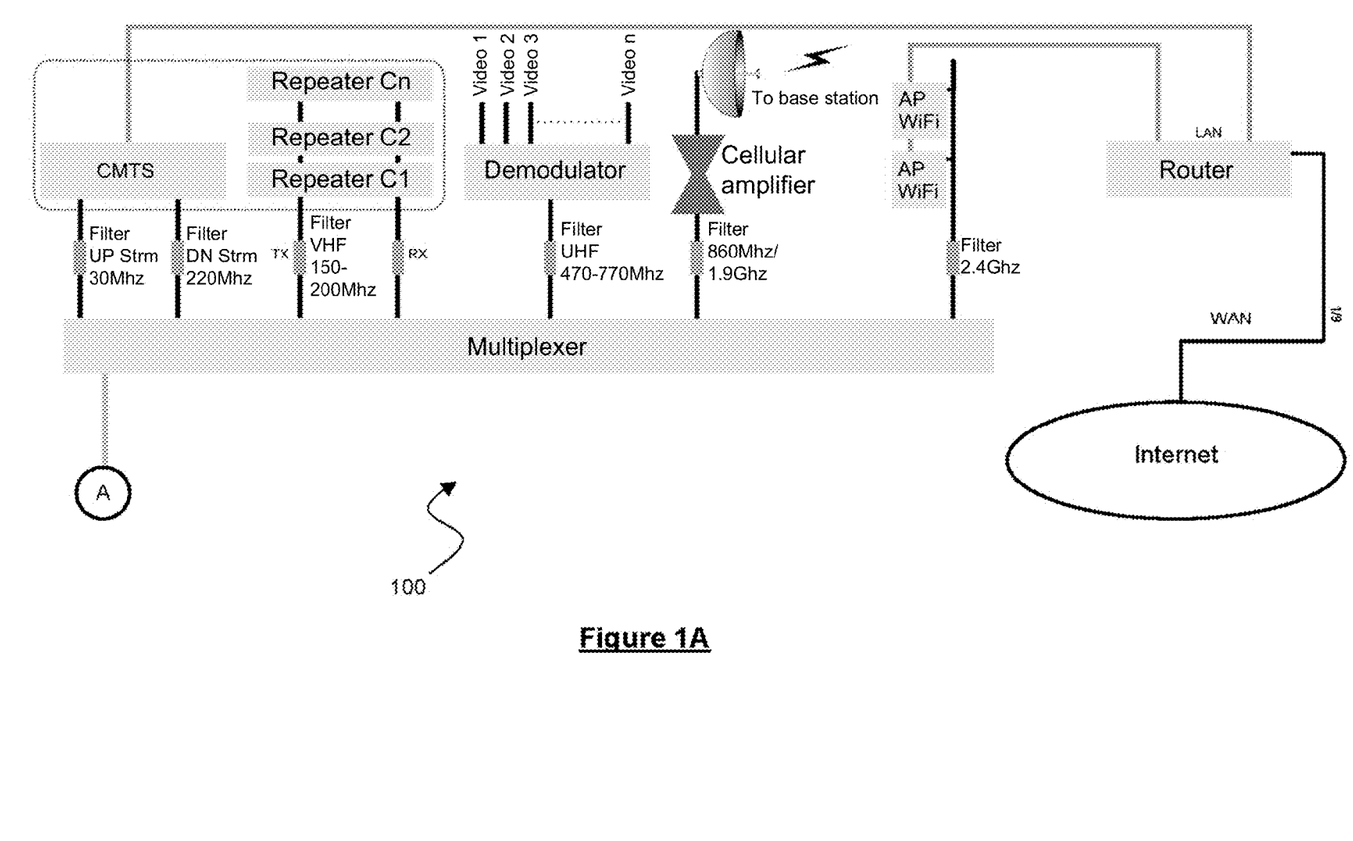
FIGS. 1A to 1D are a schematic representation of a network carrying multiple technologies over a leaky feeder.
Figure 1B:
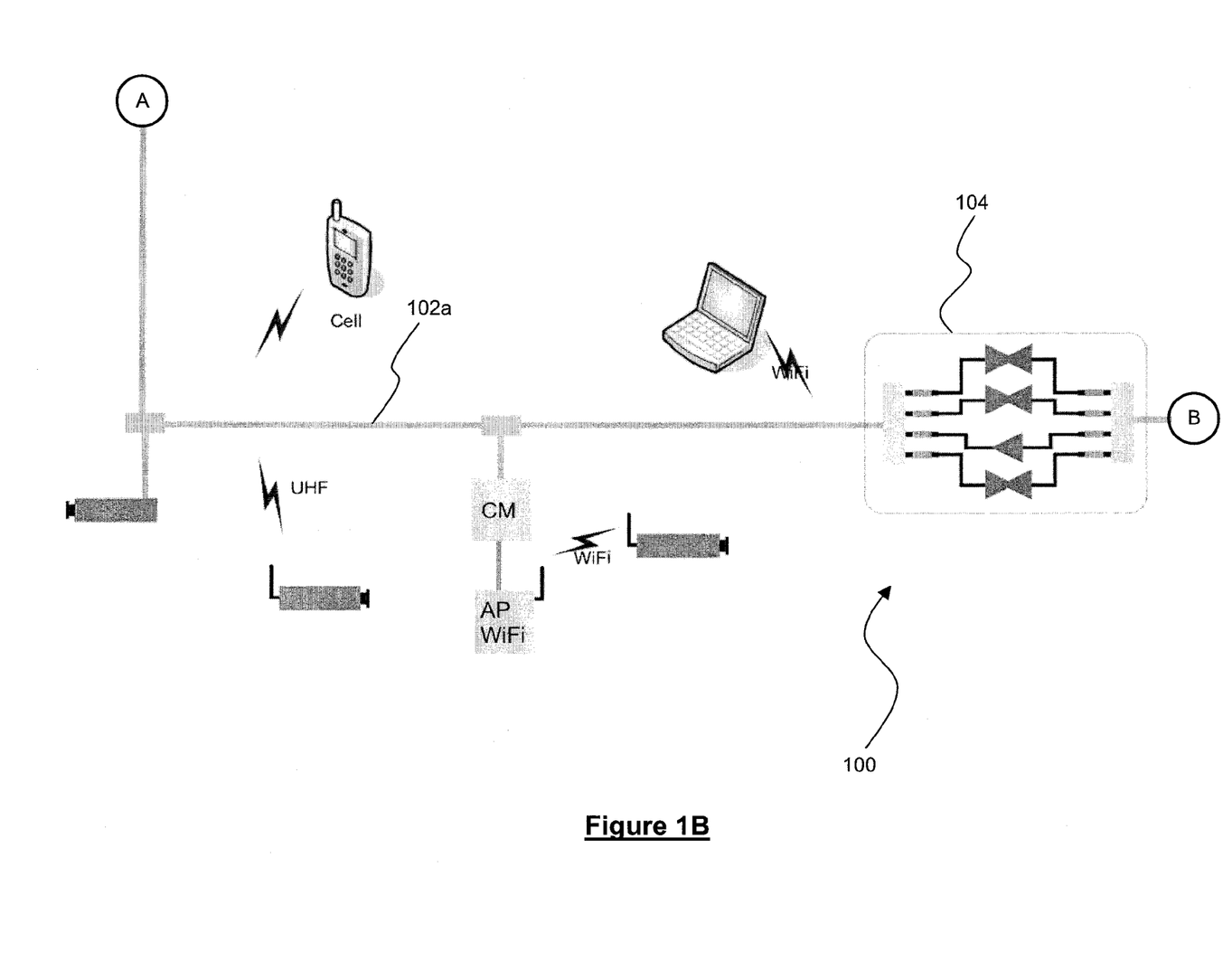
Figure 1C:
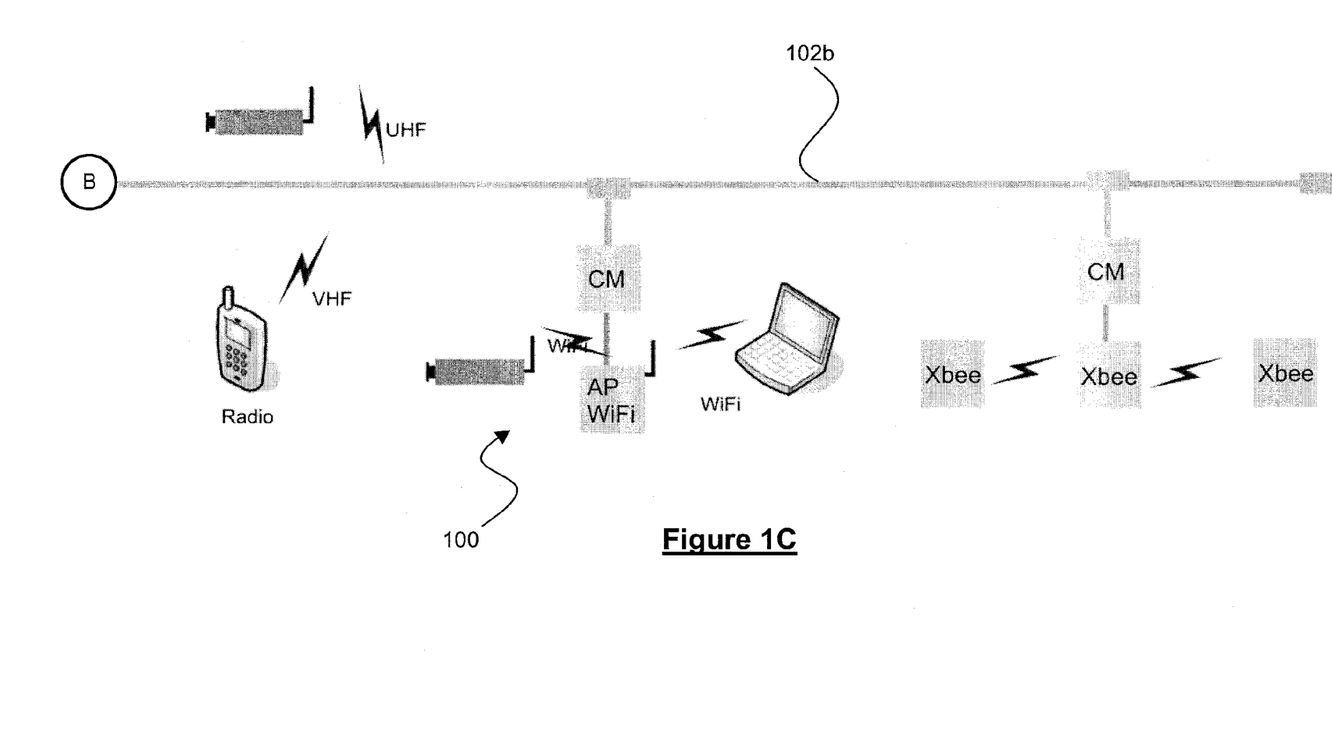
Figure 1D:
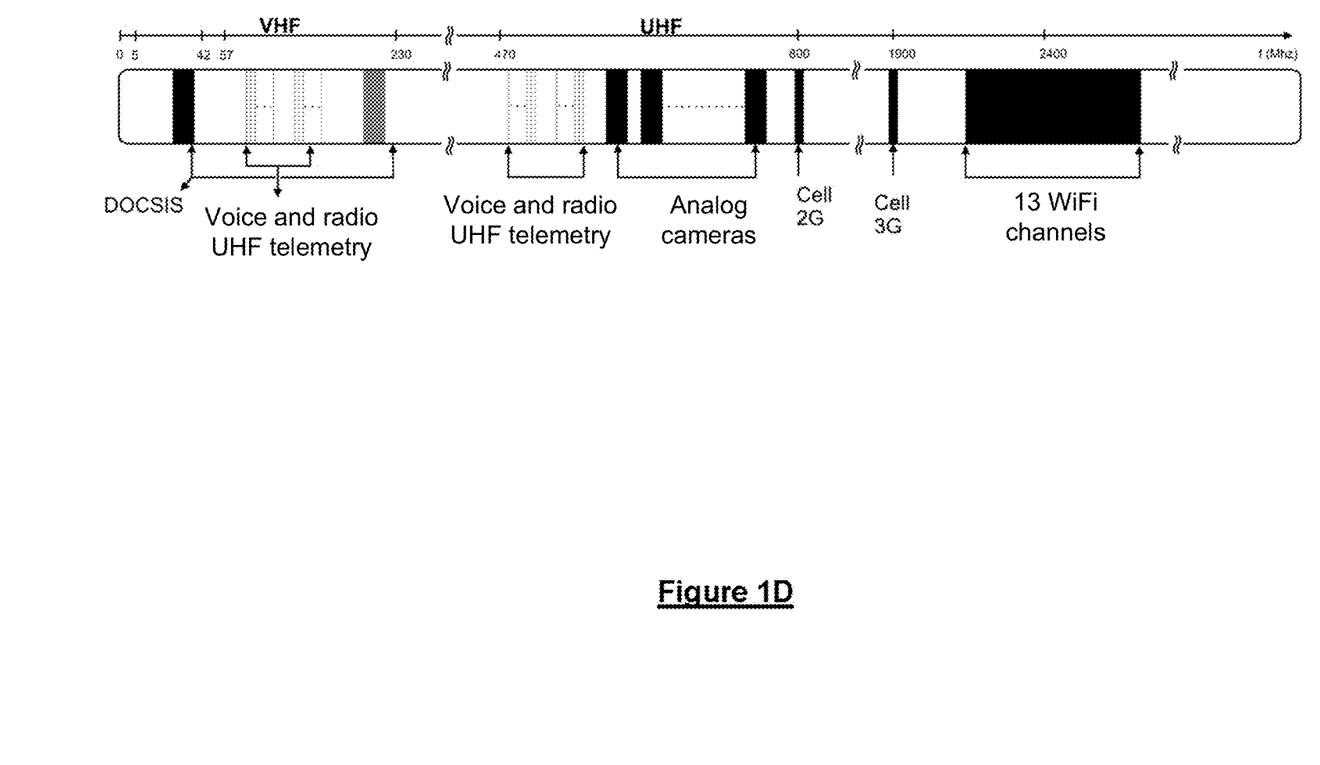

Multiple technologies are generally frequency multiplexed for transmission over the leaky feeders 102a and 102b, and a frequency band is assigned to each technology. An exemplary frequency band assignment is depicted in FIG. 1D. However, the embodiments as described herein are generally not limited to this particular frequency band assignment.

By its flexibility, the network 100 may support various applications by offering both radiation and transmission capabilities. Some applications take advantage of the radiation capabilities of the network 100, others the transmission capability, while certain applications may use both the radiation and transmission capabilities.

To offer a wide variety of data applications, a protocol, such as Data over Cable Service Interface Specification (DOCSIS) may be used to integrate TCP/IP functionality. Integration of TCP/IP supports IP applications such as voice over IP, IP video, data transfer, access to the Internet, etc.

As the transmission of signals is performed on leaky feeder, regeneration of the signal is required. Since (as described herein) the transmitted signal may include a plurality of signals of various frequencies and technologies, regenerating the signal should take into consideration the particularities of each technology. To this end, the embodiments as generally described herein provide a regenerator and a repeater. Depending on the type of signal (e.g. which technology), an appropriate signal regenerator and repeater may be used.

By associating repeaters, amplifiers and filters operating at different frequency bands, it is generally possible to ensure a sufficient power level for each frequency band to perform at least one of transmission and radiation.

Figure 2:
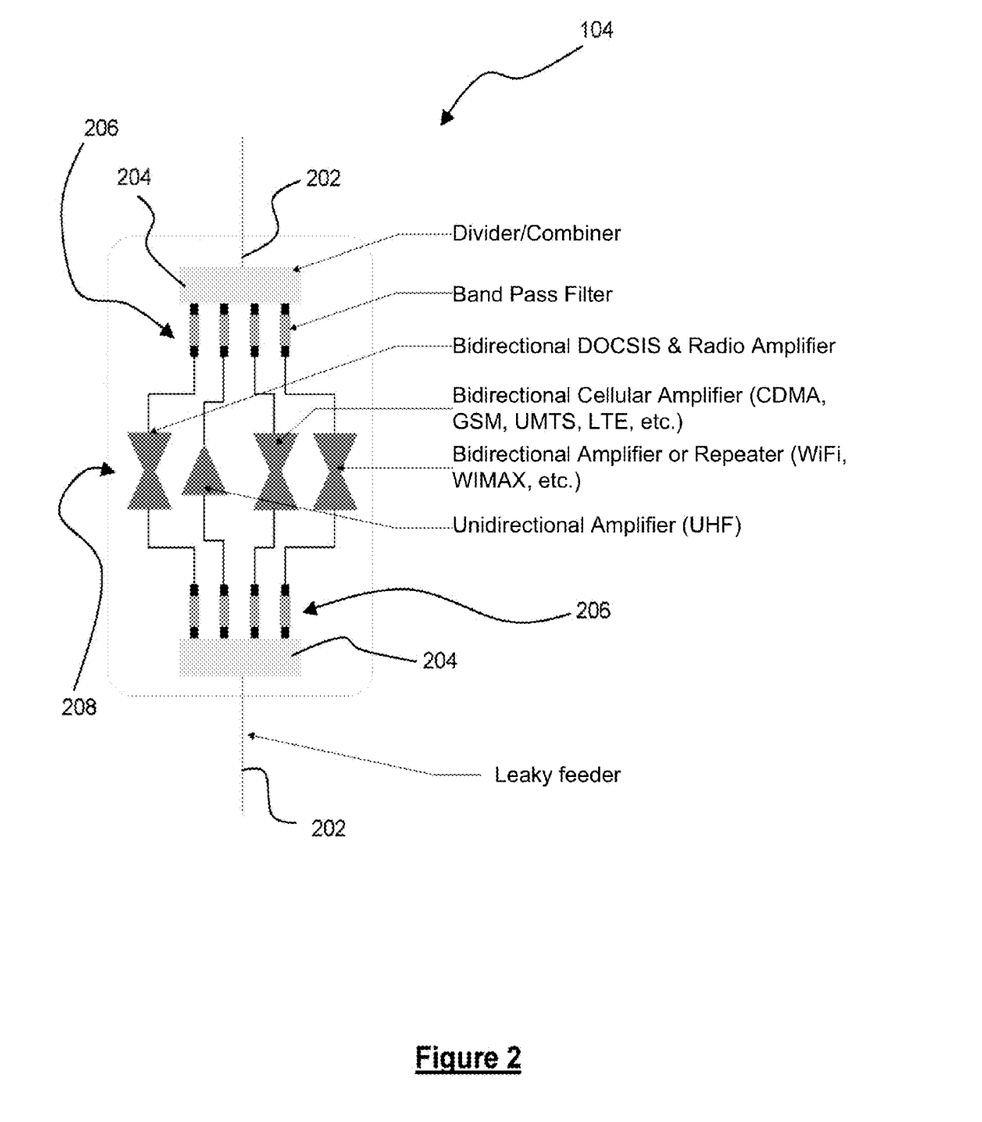
FIG. 2 is a schematic representation of a regenerator for a multi-band signal.

Reference is now made to FIG. 2, which schematically depicts a regenerator 104 in accordance with some embodiments as described herein. The regenerator 104 generally includes an input and an output. Particularly, as shown on FIG. 2, the regenerator 104 may comprise two input/output ports 202.

The input port receives the signal comprising a plurality of signals of different technologies. For transmission and radiation on the leaky feeder, the plurality of signals are frequency multiplexed. To appropriately regenerate the plurality of transmitted signals, the regenerator 104 includes a pair of divider/combiners 204 and a plurality of band-pass filters 206. By means of the divider/combiner 204 and the plurality of band-pass filters 206, the incoming signal may be divided per frequency band (and thus per technology).

Alternately, in some embodiments the pair of divider/combiners 204 could be substituted with a pair of multiplexers/demultiplexers.

Once the signal has been divided per frequency bands, the signal is amplified per technology using one or more amplifiers 208. As various technologies are regenerated by the present regenerator, each path of the regenerator in FIG. 2 generally corresponds to one technology, and will generally be discussed independently.

Generally, the amplifiers 208 and repeaters may be selected based on the particularities of each technology. Examples of amplifiers 208 could include wireless amplifiers such as WiFi amplifiers, WiMax amplifiers, DOCSIS amplifiers, VHF or UHF amplifiers, etc.

More particularly, for UHF signals used (for example) for carrying audio and video signals from one or several cameras, a unidirectional amplifier may be used. The unidirectional amplifier can be realized with one or more low noise amplifiers, one or more power amplifiers, one or more surface acoustic wave filters for each corresponding band, or some combination thereof.

For signals using frequency division duplexing technologies, a bidirectional amplifier may be used. Such a bidirectional amplifier may be designed by putting in parallel two unidirectional amplifiers, each one of the unidirectional amplifiers corresponding to one of the transmitting and receiving frequencies.

For time division duplexing, as the transmitting and receiving frequencies are the same, one possible embodiment for amplifying the signal is to use a bidirectional amplifier and commuting between the received and transmitted signal. However, such commuting can introduce significant delays, and when the signal is amplified at multiple points of the leaky feeder, the overall signal rate may be considerably reduced.

Figure 3:
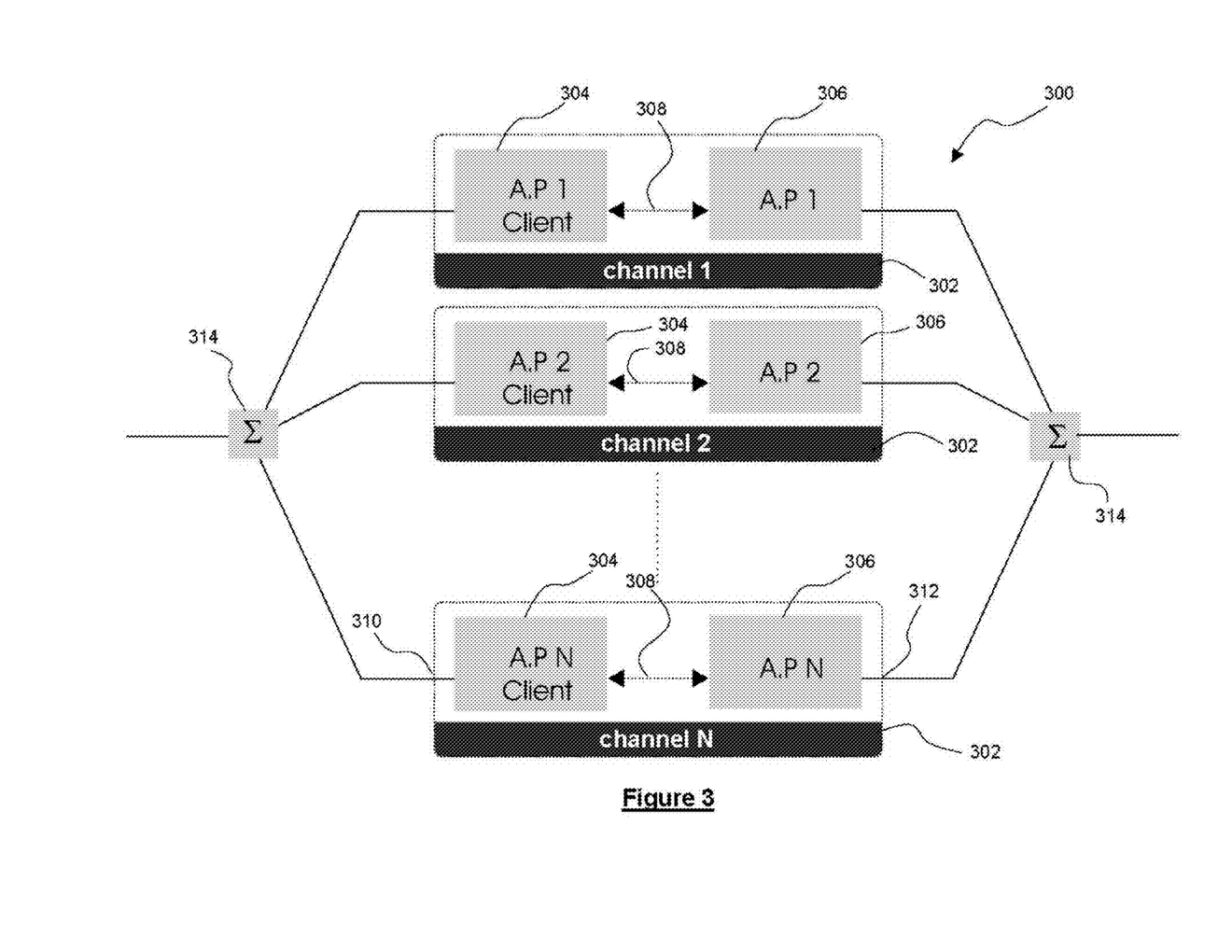
FIG. 3 is a schematic representation of a repeater in accordance with some embodiments.

To overcome such problems, some embodiments for time division duplexed signals provide a repeater 300 as shown for example in FIG. 3. For each channel 302 (including one or several connections) of the time division duplexed signal (e.g., channels 1, channel 2 to channel 'n'), a pair of access points 304 and 306 is provided. By grouping the connections into a plurality of channels 302, it is generally possible to increase the capacity of the network 100.

The number of connections per channel 302 may depend on the type of technology, such as WiFi, WiMAX, etc.

Generally, the first access point 304 of the pair is configured in a first mode and the second access point 306 of the pair is configured in a second mode. As shown, each pair of access points 304 and 306 may be linked by a broadband serial wired data connection 308.

Channels 302 are orthogonal to one another so as to avoid spectral overlap.

More particularly, the first access point 304 of the pair may be configured in a client mode and the second access point 306 in an access mode. Each pair of access points 304 and 306 is connected by the broadband serial wired data connection 308 using for example an Ethernet cable, a Peripheral Component Interconnect (PCI) cable, a PCI express (PCIe) card, etc. To this end, in some embodiments the first and second access points 304 and 306 of the repeater 300 may further comprise an Ethernet port, a Peripheral Component Interconnect (PCI) card, a PCIe card, and so on.

In some embodiments, the first access point 304 (configured in client mode) may provide access to networks such as WiFi (IEEE 802.11), WiMax (IEEE 802.16), or any other similar networks, while the second access point 306 (configured in access mode) provides access to users of the WiFi or WiMax networks. In some embodiments, the first and second access points 304, 306 may provide access to users over a TD-LTE (Time Division-Long Term Evolution) network.

Each channel 302 of the time divisional duplexed signal may be handed off between the first and second access points 304 and 306 in accordance with the handoff standard of each technology.

By using multiple channels 302, it is possible to increase the capacity of the corresponding network by supporting a large (or in some embodiments maximum) number of connections on each channel.

The repeater 300 further comprises an input port 310 and an output port 312. The input port 310 is adapted for receiving the channels 302 of the time division duplexed signal. The output port 312 is adapted for transmitting the time division duplexed signal that have been repeated by the first and second access points 304 and 306.

The amplified and repeated signals are then combined 314 and retransmitted on the leaky feeder 102 through the output 312. Only one input 310 and one output 312 have been shown for each pair of access points 304 and 306 (in this case for channel 'n'), for clarity. Those skilled in the art will understand that for time division duplexed signals, each access point 304 and 306 would include an input 310 and an output 312.

Figure 4:
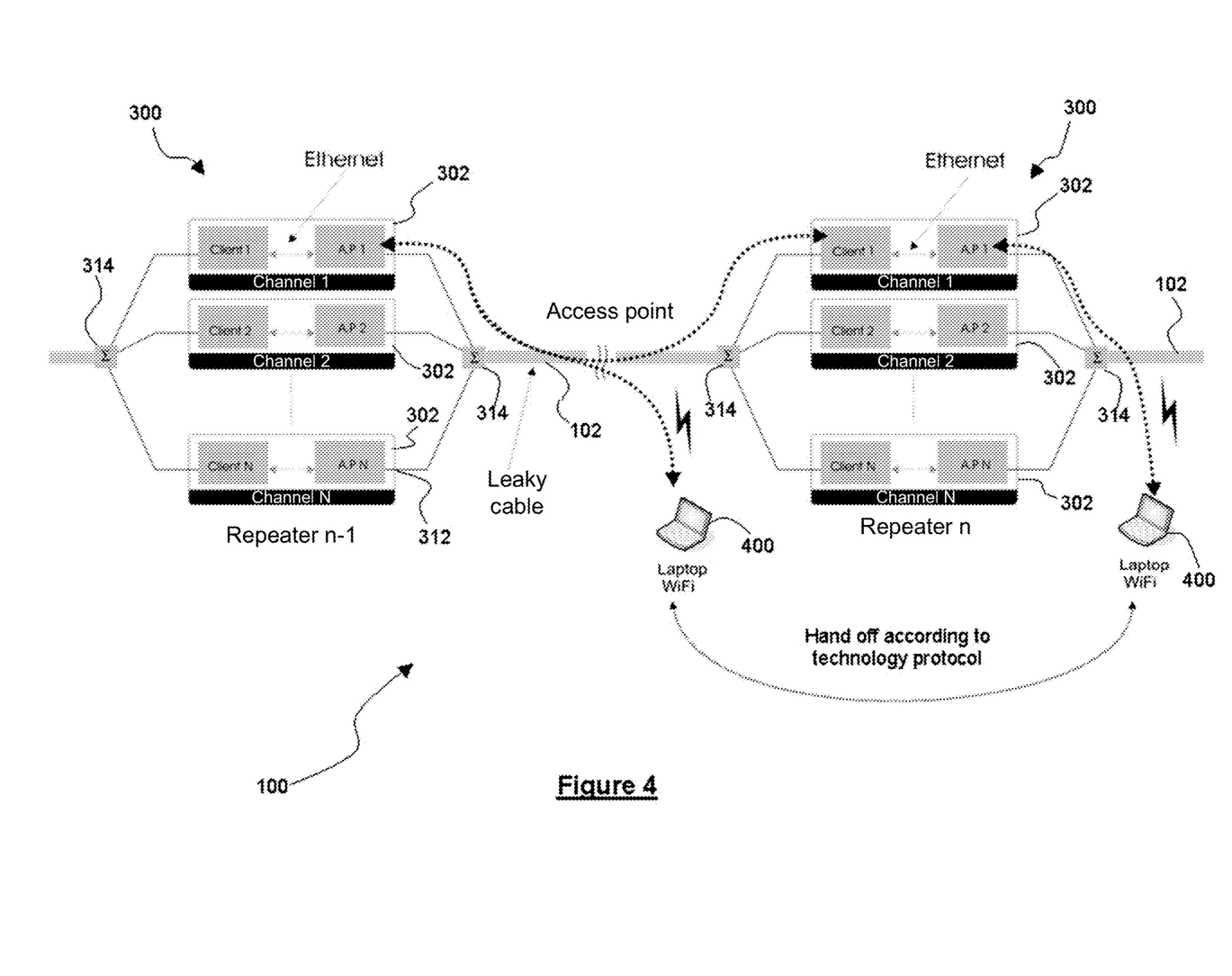
FIG. 4 is a schematic representation of a series of repeaters in accordance with some embodiments.

Reference is now made to FIG. 4, which depicts a series of repeaters 300 in accordance with another aspect of the embodiments described herein. In this aspect, two repeaters 300 are depicted. As can be appreciated, the time division duplexed signal travels along the leaky cable 102 and may be repeated in one or more locations, depending on the distance to be traveled.

When several repeaters 300 are used, the repeaters 300 may be configured in such a manner that the various channels 302 alternate from an access point in access mode 306 to an access point in client mode 304, and vice-versa.

In various embodiments, electronic devices 400, such as laptops (as shown), cell phones, Personal Digital Assistants (PDAs), tablet computers, or other electronic devices capable of performing wireless communications in accordance with one of the protocols and standards supported by the network 100, can access such wireless services by means of the leaky cable 102. The device 400 is handed off from one leaky cable 102 to the next leaky cable 102 by the repeater 300, which can perform such a hand off in accordance with the protocol and standard being used for the particular technology.

Figure 5:
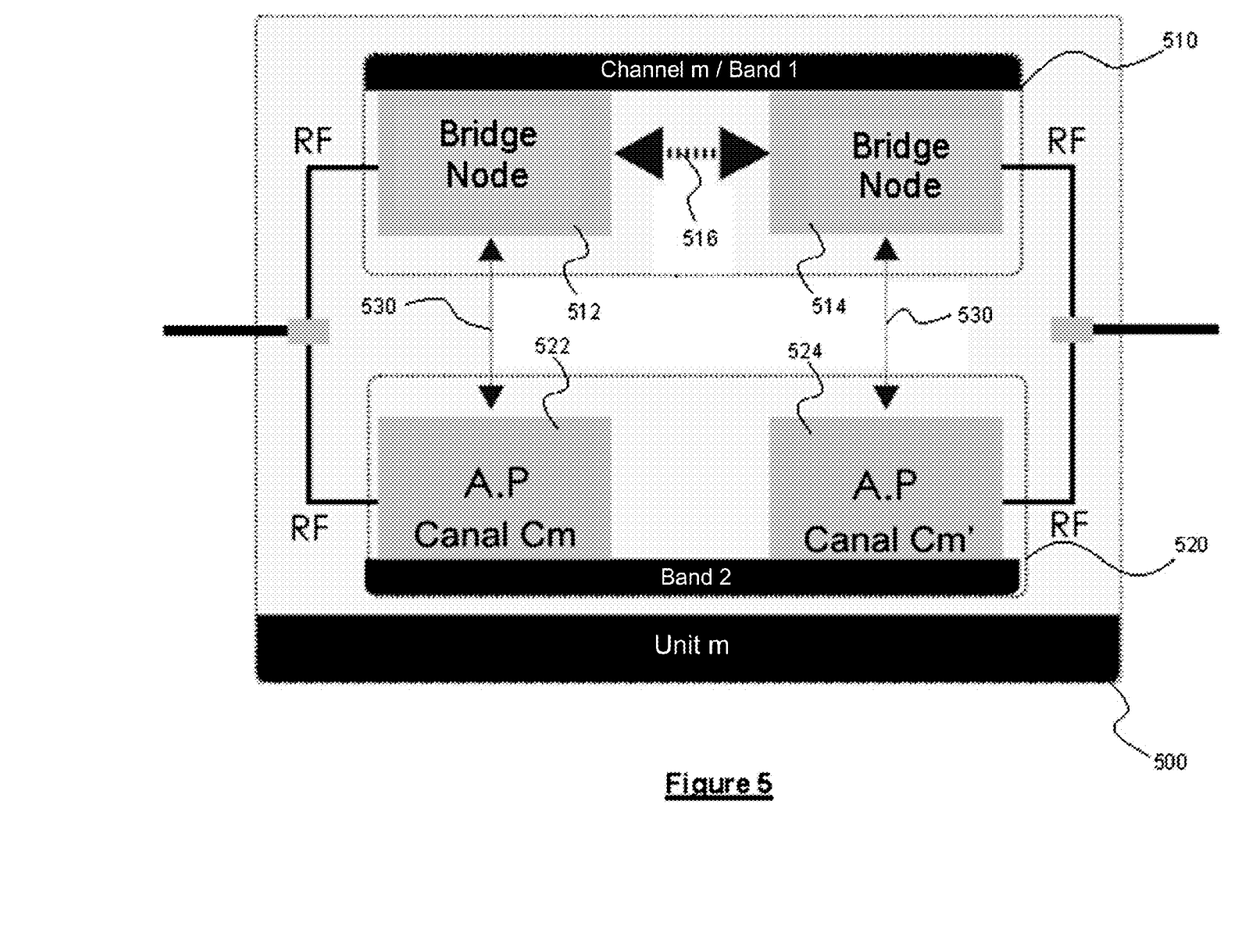
FIG. 5 is a schematic representation of another aspect of a repeater.

Turning now to FIG. 5, illustrated therein is a schematic representation of another aspect of a repeater. In this aspect, one or several units 500 are provided within a repeater. Each unit 500 includes two sub-units 510 and 520. The two sub-units 510 and 520 may be interconnected by means of broadband serial wired data connections 530. The first sub-unit 510 includes two bridge nodes 512 and 514 interconnected by a broadband serial wired data connection 516. These two bridge nodes 512 and 514 repeat and transfer the time division duplexed signal received from one leaky cable to a subsequent leaky cable.

Each of the bridge nodes 512 and 514 are further connected to one of two access points 522 and 524 of the second sub-unit 520 (for example by means of broadband serial wired data connections 530). The access nodes 522 and 524 generally provide radio coverage to wireless access to electronic devices 400 in the vicinity of the repeater 500.

To ensure proper operation, the first and second sub-units 510 and 520 may operate on two different frequency bands.

The capacity of the repeater may be determined by the number of units 500 implemented. The use of interconnected sub-units 510 and 520 may further provide a dual repeating and access functionality to the unit 500.

Figure 6:
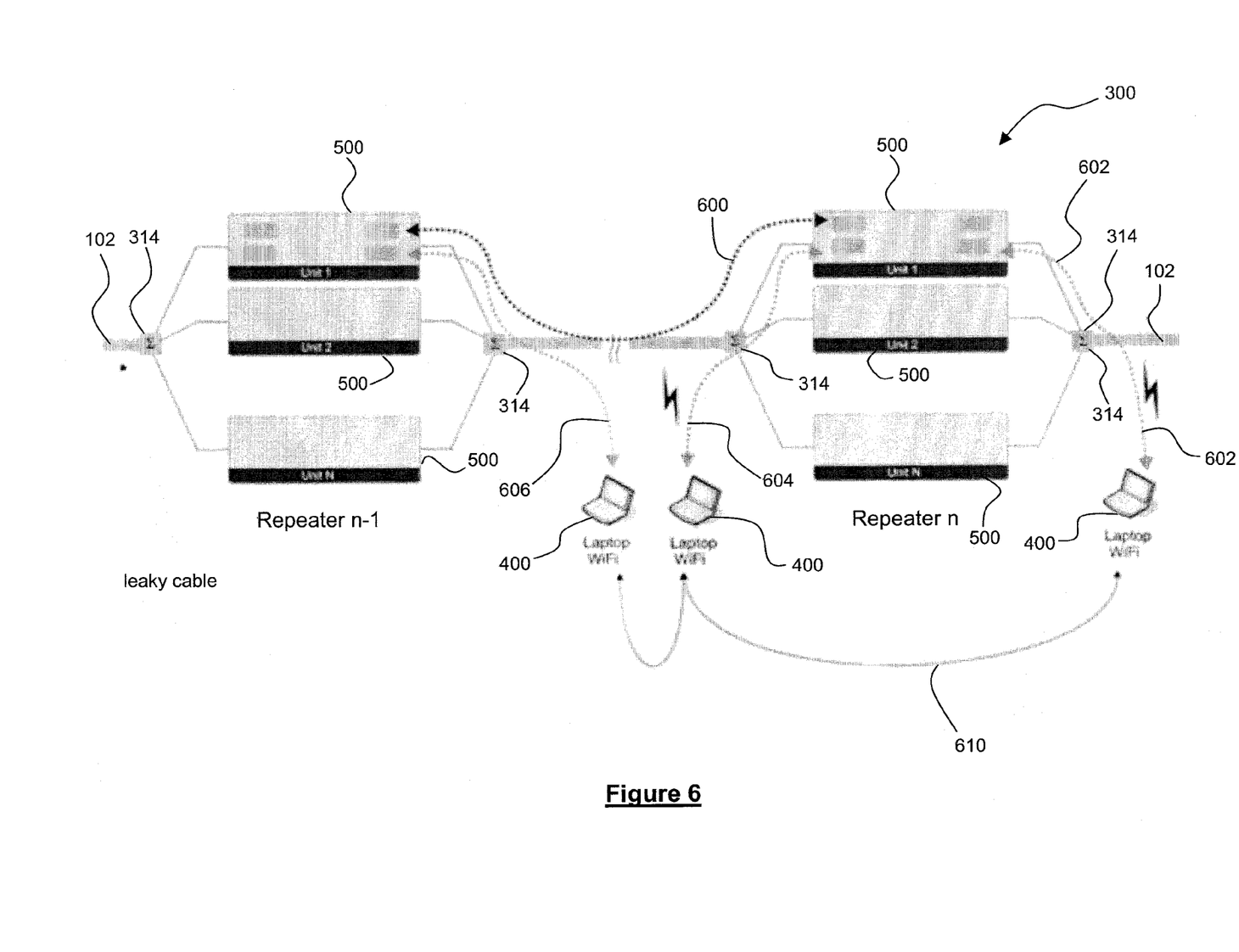
FIG. 6 is a schematic representation of multiple repeaters of FIG. 5 implemented in a network.

FIG. 6 is a schematic representation of multiple repeaters of FIG. 5 implemented in the network 100. Several units 500 are depicted for each repeater, although the number of depicted units 500 is for representative purposes only and should not be interpreted being limiting. In various embodiments, a greater number or fewer units could be used.

Generally, the time division duplexed signal travels along the leaky cables 102, and is amplified by being repeated at certain distances (represented as signal 600).

Each unit 500 corresponds to one channel of the time division duplexed signal, and each sub-unit 51Q and 520 may function on an independent frequency band (e.g., band 1 and band 2).

The units 500 may further provide wireless access to electronic devices 400, represented as signals 602, 604 and 606. If the electronic device 400 is in movement, the wireless access may be handed off from one access mode to another access mode (as depicted by signal 610), as prescribed by the protocols and standards being used by the access node of the sub-unit 520 and the electronic device 400.

The dual functions of the unit 500 thus repeat the time duplexed signal 600 in transit from one leaky cable to the next, and accordingly can provide a wireless access point along the length of the leaky cable 102.

Although shown on two different Figures, it would be possible and even advantageous in certain conditions to incorporate within the network 100 one or more of the units 500 and the repeaters 300.

It should be clear to those skilled in the art that the described embodiments are for exemplary purposes only, and should not be interpreted to limit the scope of the present invention. In particular, the repeater, multi-band regenerator and network as described in the description of embodiments can be modified without departing from the scope of the appended claims, which delimits the protection sought.

The invention claimed is:

1. A regenerator for a multi-band network, the network including a leaky feeder, at least one repeater along the leaky feeder, each repeater having, for each channel of the time division duplexed signal, a pair of access points, the first access point of the pair being configured in a first mode and the second access point of the pair being configured in a second mode, the pair of access points being linked by a broadband serial wired data connection, the regenerator comprising:
    an input for receiving and demultiplexing a multi-band signal, the multi-band signal comprising a plurality of signals of different technologies, each technology being carried on a predetermined frequency band;
    a plurality of filters, each filter corresponding to one of the predetermined frequency bands;
    for each technology, a corresponding amplifier for amplifying the corresponding filtered signal;
    for each channel of a time division duplexed signal of the multi-band signal, a pair of access points, the first access point of the pair being configured in a first mode and the second access point of the pair being configured in a second mode, the pair of access points being linked by a broadband serial wired data connection;
    a combiner for combining the amplified signals and the channels of the time division duplexed signal; and
    an output for retransmitting the combined signals over the multi-band network;
    wherein the first mode is a client mode and the second mode is an access mode.

2. The regenerator of claim 1, wherein the time division duplexed signal is related to one of the following standards: IEEE 802.16 or IEEE 802.11.

3. The regenerator of claim 1, wherein the access points comprise at least one of the following: an Ethernet port or a Peripheral Component Interconnect card.

4. The regenerator of claim 1, further comprising:
    an input port for receiving the time division duplexed signal; and
    an output port for retransmitting the channels of the time division duplexed signal.

5. The regenerator of claim 1, wherein each channel is handed off between the first and second access points in accordance with the handoff standard of each technology.

6. The regenerator of claim 1, wherein the network is compliant with one of the following protocols: an IEEE 802.16 or an IEEE 802.11.

7. The regenerator of claim 1, wherein each repeater further comprises:
    an input port for receiving the time division duplexed signal; and
    an output port for retransmitting the time division duplexed signal.

8. A regenerator for a multi-band network, the regenerator comprising:

an input for receiving and demultiplexing a multi-band signal, the multi-band signal comprising a plurality of signals of different technologies, each technology being carried on a predetermined frequency band;

a plurality of filters, each filter corresponding to one of the predetermined frequency bands;

for each technology, a corresponding amplifier for amplifying the corresponding filtered signal;

for each channel of a time division duplexed signal of the multi-band signal, a pair of access points, the first access point of the pair being configured in a first mode and the second access point of the pair being configured in a second mode, the pair of access points being linked by a broadband serial wired data connection;

a combiner for combining the amplified signals and the channels of the time division duplexed signal; and an output for retransmitting the combined signals over the multi-band network.

9. The regenerator of claim 8, wherein the first mode is a client mode and the second mode is an access mode.

10. The regenerator of claim 9, wherein the time division duplexed signal is compliant with one of the following standards: IEEE 802.16 or IEEE 802.11.

11. The regenerator of claim 10, wherein the access points comprise at least one of the following: an Ethernet port or a Peripheral Component Interconnect card.

12. The regenerator of claim 11, wherein each channel is handed off between the first and second connections in accordance with the handoff standard of each technology.

* * * * *